United States Patent
Hickey et al.

(10) Patent No.: US 6,359,022 B1
(45) Date of Patent: *Mar. 19, 2002

(54) PENTANE COMPATIBLE POLYESTER POLYOLS

(75) Inventors: F. Leo Hickey, Arlington Heights, IL (US); Kevin L. Rooney, San Francisco, CA (US)

(73) Assignee: Stepan Company, Northfield, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/289,043

(22) Filed: Apr. 9, 1999

Related U.S. Application Data

(63) Continuation-in-part of application No. 08/949,239, filed on Oct. 10, 1997, now Pat. No. 5,922,779.

(51) Int. Cl.$^7$ .................................. C08G 18/42
(52) U.S. Cl. ........................ 521/114; 521/131; 521/172; 252/182.24
(58) Field of Search ................ 521/114, 131, 521/172; 252/182.24

(56) References Cited

U.S. PATENT DOCUMENTS

| | | | |
|---|---|---|---|
| 1,922,459 A | 8/1933 | Schmidt et al. | |
| 3,647,759 A | 3/1972 | Walker | |
| 4,411,949 A | 10/1983 | Snider et al. | |
| 4,529,744 A | 7/1985 | Wood | |
| 4,644,048 A | * 2/1987 | Magnus | 528/176 |
| 4,714,717 A | 12/1987 | Londrigan et al. | |
| 4,897,429 A | 1/1990 | Trowell et al. | |
| 5,451,615 A | 9/1995 | Birch | |
| 5,464,562 A | 11/1995 | Patterson | |
| 5,470,501 A | 11/1995 | Fishback et al. | |
| 5,632,898 A | 5/1997 | Jung et al. | |
| 5,922,779 A | * 7/1999 | Hickey | 521/114 |
| 6,133,329 A | 10/2000 | Shieh et al. | |

FOREIGN PATENT DOCUMENTS

| | | | |
|---|---|---|---|
| CA | 2245291 | 3/1999 | ........... C08G/18/42 |
| DE | 197 42 013 A1 | 3/1999 | ........... C08G/18/42 |
| EP | 0 473 399 A2 | 3/1992 | |
| EP | 0 905 158 A1 | 3/1999 | |
| WO | WO 94/01479 | 1/1994 | |
| WO | WO 96/12759 | 5/1996 | |
| WO | WO 99/19377 | 4/1999 | ........... C08G/18/42 |

OTHER PUBLICATIONS

Van der Wauden, et al, "The Use of Polyester Polyols in CFC–Free Rigid Foams", Utech '94, Paper 21, pp. 1–5, 1994.*

Abstract of European Patent No. EP 905 161 A1, published Mar. 31, 1999.

International Search Report for International Application No. PCT/US00/09281, priority date of Sep. 4, 1999.

Wouden, Utech Asia '95, Performance of Oleochemical Based Polyester Polyols in Polyurethanes, Paper 34, pp. 1–7; 1995.

Ballhaus et al., Polyurethanes World Congress 1993, Hydrocarbons Provide Zero ODP and Zero GWP Insulation for Household Refrigeration, pp. 33–39.

* cited by examiner

*Primary Examiner*—Rachel Gorr
(74) *Attorney, Agent, or Firm*—McDonnell Boehnen Hulbert & Berghoff

(57) ABSTRACT

Disclosed are aromatic polyester polyols, polyol based resin blends, and rigid closed-cell polyisocyanate-based foams made using the polyol based resin blends. The resin blends generally comprise:

(a) an aromatic polyester polyol reaction product formed by inter-esterification of a phthalic acid based material; a hydroxylated material having a functionality of at least 2; and a hydrophobic material; and (b) a $C_4$–$C_7$ hydrocarbon blowing agent. Also disclosed is a method for preparing rigid closed-cell polyisocyanate-based foams comprising reacting a polyisocyanate and a polyol based resin blend.

16 Claims, No Drawings

PENTANE COMPATIBLE POLYESTER POLYOLS

CROSS-REFERENCE

This is a continuation-in-part of U.S. patent application Ser. No. 08/949,239, filed Oct. 10, 1997 and issued as U.S. Pat. No. 5,922,779.

BACKGROUND OF THE INVENTION

1. Field of the Invention

The present invention relates to rigid, closed-cell polyurethane- and polyisocyanurate-based foams and to polyol based resin blends used to make such foams. In particular, the invention relates to polyol based resin blends containing a modified aromatic polyester polyol and a hydrocarbon blowing agent.

2. Description of the Related Art

Polyurethane and polyisocyanurate foams are commonly produced by preparing a resin blend (also known as "B component") and subsequently mixing the resin blend with an isocyanate immediately prior to discharging the final foam-generating mixture. This resin blend typically contains a polyol or a mixture of polyols, catalysts, silicone or other cell-stabilizing surfactants, and one or more blowing agents which vaporize due to the heat of reaction, resulting in expansion of the foam. It may also contain water, as an additional blowing agent, which functions by chemically reacting with isocyanate to generate carbon dioxide; flame retardants; and other additives.

In such a foam producing process, the resin blend importantly is phase stable, resisting separation into layers of different composition. Often the resin blend is packaged for later sale or use, rather than being used immediately. Even if the resin blend ingredients are blended only by the end user, some time may elapse before the blend is completely consumed in the course of normal production. In some cases, this elapsed time may amount to as much as several days. In either type of application, if the ingredients separate into discrete layers, the resin blend will not perform correctly in use.

As another desirable feature in such a foam producing process, the resin blend ideally has a viscosity sufficiently low to allow easy pumping and mixing. A resin blend having high viscosity can cause difficulties in material transfer, as for example in transporting the resin blend from storage to the foam machine or from the machine holding tank to the mixing head. Excessive viscosity can also seriously obstruct efficient mixing with the isocyanate in the mixing head. For instance, in high-pressure impingement mixing, mixing efficiency may decline when the viscosity of the resin blend is greater than about 1000 to 2000 centipoise at the temperature of use. A resin blend viscosity of less than 1000 centipoise is thus preferred.

In an alternative process for producing polyurethane and polyisocyanurate foams, all ingredients of the resin blend except the blowing agent are combined into one pre-blend. The blowing agent is then either added to the pre-blend and mixed as the combination is transferred to the final mixing head, as by the use of an inline mixer, or the blowing agent is added at the final mixing head itself. The isocyanate, or a mixture of isocyanate and blowing agent, along with other optionally preferred ingredients, are simultaneously transferred to the mixing head, where they are mixed with the pre-blend and blowing agent and discharged to produce the polyurethane or polyisocyanurate foam. Although phase stability need not be maintained for more than a few seconds in such a process, the pre-blend nevertheless ideally mixes easily and uniformly with the blowing agent and the resulting resin blend ideally has a viscosity of less than 1000 centipoise to facilitate mixing with the isocyanate.

In certain circumstances, volatile hydrocarbons such as pentane and cyclopentane can be viable blowing agents for rigid foams. However, when such volatile hydrocarbons are used with existing polyols, poor phase stability and high resin blend viscosity generally result. Inadequate phase stability may be addressed by introducing the blowing agent in a separate stream at or near the mix head, or by constant agitation of the pre-mixed resin blend in a holding tank, as described in "Hydrocarbons Provide Zero ODP and Zero GWP Insulation for Household Refrigeration" by H. Ballhaus and H. Hahn, in *Proceedings of the Polyurethanes World Congress* 1993, pages 33–39. However, these approaches are not useful for producing a phase-stable resin blend for later use, and also do not solve the problems of agitation and pumping difficulties associated with high viscosity.

U.S. Pat. No. 5,464,562 and U.S. Pat. No. 5,470,501 describe the use of certain polyoxyalkylene surfactants in combination with polyester polyols and hydrocarbon blowing agents, with improved phase stability. However, the stability described therein is of limited duration, consisting of only up to 3 hours when utilizing normal pentane and 4 days when utilizing cyclopentane. In addition, these disclosures are silent with respect to undesirable high resin blend viscosity.

Van der Wouden, *The Use of Polyester Polyols in CFC-Free Rigid Foams*, Utech '94, Paper 21, pp. 1–5, and van der Wouden, Performance of Oleochemical Based Polyester Polyols in Polyurethanes, Utech Asia '95, Paper 34, pp. 1–7 disclose that dimer acid-based polyester polyols can be added to hydrocarbon-incompatible polyether polyols to produce a hydrocarbon-soluble polyol blend.

SUMMARY OF THE INVENTION

The invention provides resin blends based on certain aromatic polyester polyols and hydrocarbon blowing agents. Resin blends of the invention have increased phase stability and lower viscosity compared to known blends and do not require the presence of nonionic surfactants. The absence of nonionic surfactants simplifies the composition and manufacture of the resin blends of the invention as compared to known blends. The absence of nonionic surfactants also eliminates a monohydroxyl material that can weaken polyurethane or polyisocyanurate foam structure by causing termination of polymer chains.

Thus, in a first aspect the invention provides a polyol based resin blend comprising:

(a) a polyol component comprising an aromatic polyester polyol reaction product formed by inter-esterification of:
  (i) a phthalic acid based material;
  (ii) a hydroxylated material having a functionality of at least 2; and
  (iii) a hydrophobic material having:
    (1) from one to six radicals, the radicals being selected from the group consisting of carboxylic acid groups, carboxylic acid ester groups, hydroxyl groups, and mixtures thereof;
    (2) hydrocarbon groups totaling at least 4 carbon atoms for each radical present; and '(3) an average molecular weight of from about 100 to about 1000; wherein the hydrophobic material is substantially free of dimer acid; and (b) a $C_4$–$C_7$ hydrocarbon blowing agent.

In another aspect, the invention provides a polyol based resin blend comprising:

(a) a polyol component comprising:
  (I) an aromatic polyester polyol reaction product formed by inter-esterification of:
    (i) a phthalic acid based material;
    (ii) a hydroxylated material having a functionality of at least 2; and
    (iii) a hydrophobic material having: (1) from one to six radicals, the radicals being selected from the group consisting of carboxylic acid groups, carboxylic acid ester groups, hydroxyl groups, and mixtures thereof; (2) hydrocarbon groups totaling at least 4 carbon atoms for each radical present; and (3) an average molecular weight of from about 100 to about 1000; wherein the hydrophobic material is substantially free of dimer acid; and
  (II) a polyether polyol; and
(b) a $C_4$–$C_7$ hydrocarbon blowing agent.

In yet another aspect, the invention provides an aromatic polyester polyol reaction product formed by inter-esterification of:

(i) a phthalic acid based material;
(ii) a hydroxylated material having a functionality of at least 2; and
(iii) a hydrophobic material having:
  (1) from one to six radicals, the radicals being selected from the group consisting of carboxylic acid groups, carboxylic acid ester groups, hydroxyl groups, and mixtures thereof;
  (2) hydrocarbon groups totaling at least 4 carbon atoms for each radical present; and
  (3) an average molecular weight of from about 100 to about 1000; wherein the hydrophobic material is substantially free of dimer acid.

In still another aspect, the invention provides polyurethane or polyisocyanurate foams formed by reacting a polyisocyanate with a polyol based resin blend comprising:

(a) a polyol component comprising an aromatic polyester polyol reaction product formed by inter-esterification of:
  (i) a phthalic acid based material;
  (ii) a hydroxylated material having a functionality of at least 2; and
  (iii) a hydrophobic material having:
    (1) from one to six radicals, the radicals being selected from the group consisting of carboxylic acid groups, carboxylic acid ester groups, hydroxyl groups, and mixtures thereof,
    (2) hydrocarbon groups totaling at least 4 carbon atoms for each radical present; and
    (3) an average molecular weight of from about 100 to about 1000; wherein the hydrophobic material is substantially free of dimer acid; and
(b) a $C_4$–$C_7$ hydrocarbon blowing agent.

In a further aspect, the invention provides polyurethane or polyisocyanurate foams formed by reacting a polyisocyanate with a polyol based resin blend comprising:

(a) a polyol component comprising:
  (I) an aromatic polyester polyol reaction product formed by inter-esterification of:
    (i) a phthalic acid based material;
    (ii) a hydroxylated material having a functionality of at least 2; and
    (iii) a hydrophobic material having:
      (1) from one to six radicals, the radicals being selected from the group consisting of carboxylic acid groups, carboxylic acid ester groups, hydroxyl groups, and mixtures thereof,
      (2) hydrocarbon groups totaling at least 4 carbon atoms for each radical present; and
      (3) an average molecular weight of from about 100 to about 1000; wherein the hydrophobic material is substantially free of dimer acid; and
  (II) a polyether polyol; and
(b) a $C_4$–$C_7$ hydrocarbon blowing agent.

In yet a further aspect, the invention provides a method for preparing a rigid closed-cell polyisocyanate-based foam, comprising reacting a polyisocyanate and a polyol based resin blend, wherein the polyol based resin blend comprises:

(a) a polyol component comprising an aromatic polyester polyol reaction product formed by inter-esterification of:
  (i) a phthalic acid based material;
  (ii) a hydroxylated material having a functionality of at least 2; and
  (iii) a hydrophobic material having:
    (1) from one to six radicals, the radicals being selected from the group consisting of carboxylic acid groups, carboxylic acid ester groups, hydroxyl groups, and mixtures thereof;
    (2) hydrocarbon groups totaling at least 4 carbon atoms for each radical present; and
    (3) an average molecular weight of from about 100 to about 1000; wherein the hydrophobic material is substantially free of dimer acid; and
(b) a $C_4$–$C_7$ hydrocarbon blowing agent.

In a still further aspect, the invention provides a method for preparing a rigid closed-cell polyisocyanate-based foam, comprising reacting a polyisocyanate and a polyol based resin blend, wherein the polyol based resin blend comprises:

(a) a polyol component comprising:
  (I) an aromatic polyester polyol reaction product formed by inter-esterification of:
    (i) a phthalic acid based material;
    (ii) a hydroxylated material having a functionality of at least 2; and
    (iii) a hydrophobic material having:
      (1) from one to six radicals, the radicals being selected from the group consisting of carboxylic acid groups, carboxylic acid ester groups, hydroxyl groups, and mixtures thereof;
      (2) hydrocarbon groups totaling at least 4 carbon atoms for each radical present; and
      (3) an average molecular weight of from about 100 to about 1000; wherein the hydrophobic material is substantially free of dimer acid; and
  (II) a polyether polyol; and
(b) a $C_4$–$C_7$ hydrocarbon blowing agent.

The resin blends detailed herein are used to make rigid closed cell polyisocyanate-based foams having dimensional stability, good insulation value and excellent flame retardance. Further, in accordance with the present invention, it is not necessary to pre-blend the blowing agent in the polyol component of the resin blend prior to feeding the resin blend to the mixing head.

DETAILED DESCRIPTION OF THE INVENTION

Polyol Component

The amount of the polyol component in a resin blend of the invention is from about 65 to about 99 percent by weight.

More preferably, the amount of polyol component is from about 70 to about 90 percent by weight, based on the total weight of the resin blend. Most preferably, the amount of polyol component is from about 75 to about 85 percent by weight, based on the total weight of the resin blend. The polyol component can comprise solely an aromatic polyester polyol reaction product, or it can comprise a mixture of an aromatic polyester polyol reaction product and a polyether polyol. Optionally, the polyol component can further comprise other polyols. The aromatic polyester polyol reaction product can be prepared directly from reactants which include phthalic acid based material, a hydroxylated material, and a hydrophobic material. Alternatively, the aromatic polyester polyol reaction product can be prepared by reacting a preformed polyester polyol, i.e. a polyol which is the reaction product of a phthalic acid based material and a hydroxylated material, with a hydrophobic material.

A. Aromatic Polyester Polyol

A key aspect of the present invention is an aromatic polyester polyol reaction product formed by inter-esterification of a ternary system comprising a phthalic acid based material, a hydroxylated material and a hydrophobic material. The term inter-esterification as used herein means that the phthalic acid based material is esterified and/or transesterified by the hydroxylated material and/or the hydrophobic material, and the hydroxylated material is additionally esterified and/or transesterified by the hydrophobic material, to produce an inter-esterification product. This inter-esterification product contains one or more phthalic acid moieties randomly interspersed between the hydroxylated material and/or the hydrophobic material. The inter-esterification reaction typically occurs at a temperature of about 180° C. to about 220° C., although other temperatures can satisfactorily enable the desired inter-esterification reaction.

As described more fully below, the aromatic polyester polyol reaction product is formed by inter-esterification of:
  (i) a phthalic acid based material;
  (ii) a hydroxylated material having a functionality of at least 2; and
  (iii) a hydrophobic material having:
    (1) from one to six radicals, the radicals being selected from the group consisting of carboxylic acid groups, carboxylic acid ester groups, hydroxyl groups, and mixtures thereof;
    (2) hydrocarbon groups totaling at least 4 carbon atoms for each radical present; and
    (3) an average molecular weight of from about 100 to about 1000;
wherein the hydrophobic material is substantially free of dimer acid.

The term functionality as used herein means the number of reactive groups, e.g., hydroxyl groups, in a molecule. The term "polyester polyol" as used herein means a polyol having ester linkages.

The amount of phthalic acid based material reactant, based on the combined weight of phthalic acid based material, hydroxylated material, and hydrophobic material, is from about 10 to about 70 percent by weight, more preferably from about 20 to about 50 percent by weight, and most preferably about 25 to about 35 percent by weight. The amount of hydroxylated material reactant, based on the combined weight of phthalic acid based material, hydroxylated material, and hydrophobic material, is from about 20 to about 60 percent by weight, more preferably from about 30 to about 50 percent by weight, and most preferably about 35 to about 45 percent by weight. The amount of hydrophobic material reactant, based on the combined weight of phthalic acid based material, hydroxylated material, and hydrophobic material, is from about 1 to about 40 percent by weight, more preferably from about 5 to about 40 percent by weight, and most preferably about 15 to about 40 percent by weight.

An aromatic polyester polyol reaction product according to the invention can include any minor amounts of unreacted hydroxylated material and/or hydrophobic material remaining after polyester polyol preparation and/or can include amounts of unesterified low molecular weight polyols (e.g., glycol) admixed with the prepared aromatic polyester polyol. The aromatic polyester polyol can include up to about 40 weight percent free glycol and glycol-type materials, based on the total weight of the aromatic polyester polyol.

The aromatic polyester polyol reaction product advantageously has an average functionality of from about 1.5 to about 8.0, preferably from about 1.6 to about 6.0, and more preferably from about 1.8 to about 4.0. Generally, the aromatic polyester polyol reaction product contains an amount of phthalic acid based material relative to an amount of hydroxylated material to give an average acid value of from about 0 to about 10 and an average hydroxyl value of from about 100 to about 600, more preferably from about 100 to about 400, and most preferably from about 150 to about 350, taking into account free glycols that may be present. The aromatic polyester polyol generally contains a free glycol content, based on the total weight of aromatic polyester polyol, of from about 1 to about 30 percent by weight, and usually from about 2 to about 20 percent by weight.

The aromatic polyester polyol reaction product can be used as the sole polyol in the polyol component of the resin blend, or it can be mixed with a polyether polyol. Accordingly, the amount of the aromatic polyester polyol reaction product in the polyol component is from about 20 to about 100 percent by weight, based on the total weight of the polyol component. The amount of the aromatic polyester polyol reaction product utilized in the polyol component is determined by the requirements of the application and the physical properties required of the resulting foam. For example, in applications involving isocyanate indexes near 300, e.g., preparing typical polyisocyanurate foams, the aromatic polyester polyol reaction product advantageously is the dominant or sole polyol in the polyol component. Conversely, in applications involving isocyanate indexes near 120, e.g., preparing typical polyurethane foams, less aromatic polyester polyol reaction product is used.

In a preferred embodiment, the hydroxylated material is selected from the group consisting of ethylene glycol, diethylene glycol, triethylene glycol, propylene glycol, dipropylene glycol, trimethylene glycol, butylene glycols, 1,2-cyclohexanediol, poly(oxyalkylene)polyols derived by the condensation of ethylene oxide, propylene oxide, or any combination thereof, glycerol, 1,1,1-trimethylolpropane, 1,1,1-trimethylolethane, 2,2-dimethyl-1,3-propane diol, pentaerythritol, and mixtures thereof.

In another preferred embodiment, the hydrophobic material is selected from the group consisting of castor oil, coconut oil, corn oil, cottonseed oil, linseed oil, olive oil, palm oil, palm kernel oil, peanut oil, soybean oil, sunflower oil, tall oil, tallow, and mixtures thereof.

In other preferred embodiments, the phthalic acid based material is phthalic anhydride and the hydroxylated material is diethylene glycol or triethylene glycol.

1. Phthalic Acid Based Material

The term phthalic acid based material as used herein means phthalic acid or phthalic anhydride, or derivatives thereof. Examples of phthalic acid based materials include phthalic acid; isophthalic acid; terephthalic acid; methyl esters of phthalic, isophthalic, or terephthalic acid; phthalic anhydride; dimethyl terephthalate; polyethylene terephthalate; trimellitic anhydride; and pyromellitic dianhydride.

The phthalic acid based materials useful in preparing aromatic polyester polyols of the present invention can be (a) substantially pure phthalic acid or phthalic acid derivatives, such as phthalic anhydride, terephthalic acid, dimethyl terephthalate, isophthalic acid, trimellitic anhydride, and pyromellitic dianhydride; or (b) somewhat complex mixtures such as side stream, waste or scrap products containing residues of phthalic acid. In this context, "residues of phthalic acid" means any reacted or unreacted phthalic acid remaining in a product after its manufacture by a process in which phthalic acid or a derivative thereof is a starting component. These somewhat complex mixtures are generally available from the manufacture of phthalic acid, terephthalic acid, dimethyl terephthalate, polyethylene terephthalate, and the like.

By residues of phthalic acid is meant the group:

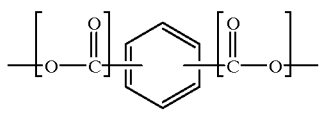

Suitable mixtures containing residues of phthalic acid for use in the invention include: (a) ester-containing byproducts from the manufacture of dimethyl terephthalate; (b) scrap polyalkylene terephthalates; (c) residues from the manufacture of phthalic acid or phthalic anhydride; (d) residues from the manufacture of terephthalic acid; and (e) combinations thereof. These pure materials and mixtures are conveniently converted to an aromatic polyester polyol by reaction with hydroxylated materials as described herein. Alternatively, these pure materials and mixtures may be converted to aromatic polyester polyols by reaction with intermediate polyols of the phthalic acid based material/hydroxylated material reaction product type through conventional transesterification or esterification procedures.

Aromatic polyester polyol reaction products of the invention advantageously contain from about 10 to about 70 percent by weight of phthalic acid based material, based on the total weight of the aromatic polyester polyol reaction product. In a more preferred embodiment, the aromatic polyester polyol reaction product contains from about 20 to about 50 percent by weight of phthalic acid based material, based on the total weight of the aromatic polyester polyol reaction product. In a most preferred embodiment, the phthalic acid based material in the aromatic polyester polyol reaction product is from about 25 to about 35 percent by weight, based on the total weight of the aromatic polyester polyol reaction product.

Preferred phthalic acid based materials useful in the present invention are characterized by the generic formulas:

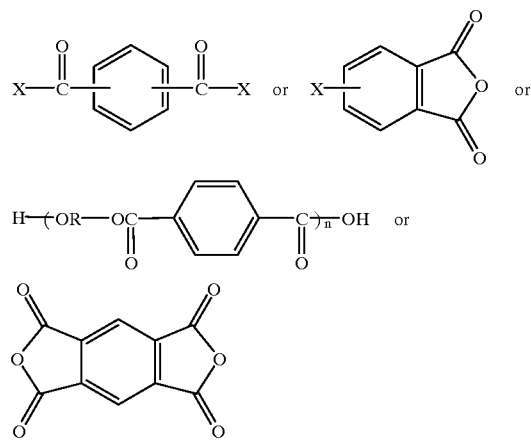

where:
X is H, halogen, hydroxyl, amino, $C_{1-6}$ alkyl, $C_{1-6}$ alkoxy, $C_{1-6}$ alkylamino, di($C_{1-6}$ alkyl)amino, hydroxy-$C_{1-6}$ alkyl, or CO—Y, where Y is H, halogen, hydroxyl, amino, $C_{1-6}$ alkyl, $C_{1-6}$ alkoxy, $C_{1-16}$ alkylamino, di($C_{1-6}$ alkyl)amino, or hydroxy-$C_{1-6}$ alkyl;
R is a $C_1$–$C_6$ alkyl group; and
n is a positive whole number.

In particularly preferred phthalic acid based materials, X is H, OH, $OCH_3$, or COOH, and R is a $C_2$ alkyl group.

A preferred phthalic acid based material for use in preparing aromatic polyester polyol reaction products of the invention is phthalic anhydride. This component can be replaced by phthalic acid, a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalate, especially polyethylene terephthalate (PET) residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. DMT process residues are commercially available from Cape Industries, Inc., under the trademark Terate®101. DMT process residues having a different composition but still containing the aromatic esters and acids are also sold by DuPont and others. The DMT process residues to be transesterified in accordance with the present invention preferably have a functionality of at least 2. Such suitable residues include those disclosed in U.S. Pat. Nos. 3,647,759; 4,411,949; 4,714,717; and 4,897,429.

2. Hydroxylated Material

The hydroxylated material may be an aliphatic diol of generic formula (1):

HO—R$^1$—OH (1)

wherein R$^1$ is a divalent radical selected from the group consisting of
(a) alkylene radicals each containing from 2 through 6 carbon atoms, and
(b) radicals of the formula (2):

—(R$^2$O)$_n$—R$^2$— (2)

where R$^2$ is an alkylene radical containing from 2 through 4 carbon atoms, and n is an integer of from 1 through 3, and
(c) mixtures thereof.

Examples of suitable aliphatic diols of formula (1) include ethylene glycol, diethylene glycol, triethylene glycol, propylene glycol, dipropylene glycol, trimethylene glycol, butylene glycols, 1,2-cyclohexanediol, poly (oxyalkylene) diols each containing from two to four alkylene radicals derived by the condensation of ethylene oxide, propylene oxide, butylene oxide, or any combinations thereof. A most preferred aliphatic diol of formula (1) is diethylene glycol. As those skilled in the art will appreciate, in preparing mixed poly(oxyethylene-oxypropylene) diols, the ethylene and propylene oxides may be added to a starting hydroxyl-containing reactant either in admixture or sequentially. Mixtures of such diols can be employed, if desired.

The hydroxylated material may also be a low molecular weight polyol. Such polyols contain less than about 7 carbon atoms per molecule and at least three hydroxyl groups per molecule. Low molecular weight polyols can be employed either alone or in combination with aliphatic diols and are useful in an amount generally ranging from greater than 0 up to 100 percent by weight of the total hydroxylated material. Preferred polyols include glycerol, 1,1,1-trimethylolpropane, 1,1,1-trimethylolethane, 2,2-dimethyl-1,3-propane diol, pentaerythritol, and mixtures thereof.

Useful polyols also include alkoxylates of low molecular weight polyols (commonly termed poly (oxyalkylene) polyols, alkoxylated polyols, or polyether polyols) having functionality of 3 or higher. Poly (oxyalkylene) polyols useful in the present invention generally include polyols reacted with from about 1 to about 10 moles of ethylene oxide, propylene oxide, or mixtures thereof. An example of such an alkoxylated polyol is glycerol reacted with 3 moles of propylene oxide, commercially available from Arco Chemical under the tradename Arcol LG-650. A most preferred poly (oxyalkylene) polyol is pentaerythritol reacted with 4 moles of ethylene oxide per mole of pentaerythritol. As those skilled in the art will appreciate, in preparing mixed poly(oxyethylene-oxypropylene) polyols, the ethylene and propylene oxides may be added to a starting hydroxyl-containing reactant either in admixture or sequentially. Mixtures of such polyols can be employed, if desired.

Additionally, amine-based aliphatic hydroxylated materials (commonly termed hydroxylated amines) may be utilized. Useful aliphatic amine diols include but are not limited to diethanolamine. Useful aliphatic amine polyols include but are not limited to triethanolamine. Such hydroxylated amines can be employed either alone or in combination with other aliphatic diols or polyols.

Aromatic polyester polyol reaction products of the present invention advantageously contain from about 20 to about 60 percent by weight of hydroxylated material, based on the total weight of the aromatic polyester polyol reaction product. In a more preferred embodiment, the aromatic polyester polyol reaction product contains from about 30 to about 50 percent by weight of hydroxylated material, based on the total weight of the aromatic polyester polyol reaction product. In a most preferred embodiment, the hydroxylated material in the aromatic polyester polyol reaction product is from about 35 to about 45 percent by weight, based on the total weight of the aromatic polyester polyol reaction product.

3. Hydrophobic Material

The term "hydrophobic material" as used herein means a compound or mixture of compounds containing one or more substantially non-polar organic moieties. The hydrophobic materials are substantially water insoluble and generally contain at least one group capable of being esterified or transesterified, such as a monocarboxylic acid group, a monocarboxylic acid ester group, or a hydroxyl group. The terms "monocarboxylic acid group" and "monocarboxylic acid ester group" as used herein means that carboxylic acid moieties present in the hydrophobic material are monoacids. Generally, the hydrophobic materials used herein are non-phthalic acid derived materials.

Any hydrophobic compound as above characterized can be employed, such as carboxylic acids (especially fatty acids), lower alkanol esters of carboxylic acids (especially fatty acid methyl esters), fatty acid alkanolamides, triglycerides (especially fats and oils), alkyl alcohols (for example, those containing from 4 to 18 carbon atoms per molecule), and the like. Mixtures of different hydrophobic compounds can be employed if desired.

Examples of fatty acids include caproic, caprylic, capric, lauric, myristic, palmitic, stearic, oleic, linoleic, linolenic, ricinoleic, and mixtures thereof. Another suitable acid is 2-ethylhexanoic acid.

Examples of fatty acid methyl esters include methyl caproate, methyl caprylate, methyl caprate, methyl laurate, methyl myristate, methyl palmitate, methyl oleate, methyl stearate, methyl linoleate, methyl linolenate, and mixtures thereof.

Examples of fatty alkanolamides include tall oil fatty acid diethanolamide, lauric acid diethanolamide, and oleic acid monoethanolamide.

Examples of alkyl alcohols include decyl alcohol, oleyl alcohol, cetyl alcohol, isodecyl alcohol, tridecyl alcohol, lauryl alcohol, mixed $C_{12}$–$C_{14}$ alcohol, and mixtures thereof.

Examples of commercially available, relatively low cost fats and oils include castor oil, coconut (including cochin)

oil, corn oil, cottonseed oil, linseed oil, olive oil, palm oil, palm kernel oil, peanut oil, soybean oil, sunflower oil, tall oil, tallow, and mixtures thereof.

Presently preferred hydrophobic materials include alkyl alcohols, lower alkylesters of fatty acids, fats, and oils. Particularly preferred hydrophobic materials include $C_{14}$–$C_{15}$ alcohol, soybean oil, and castor oil.

Aromatic polyester polyol reaction products of the present invention advantageously contain from about 1 to about 40 percent by weight of hydrophobic material, based on the total weight of the aromatic polyester polyol reaction product. In a more preferred embodiment, the aromatic polyester polyol reaction product contains from about 5 to about 40 percent by weight of hydrophobic material, based on the total weight of the aromatic polyester polyol reaction product. In a most preferred embodiment, the hydrophobic material in the aromatic polyester polyol reaction product is from about 15 to about 40 percent by weight, based on the total weight of the aromatic polyester polyol reaction product.

Alternative Polyester Polyol: Pre-Formed Polyester Polyols

The aromatic polyester polyol reaction products of the present invention are preferably prepared directly from reactants which include a phthalic acid based material, a hydroxylated material, and a hydrophobic material. However, and somewhat less preferably, the aromatic polyester polyol reaction products may be prepared from a starting material which is the reaction product of a phthalic acid based material and a hydroxylated material; i.e. a pre-formed polyester polyol. The pre-formed polyester polyol is then reacted, i.e. inter-esterified, with the hydrophobic material to make the final aromatic polyester polyol reaction product. Examples of suitable pre-formed polyols for this process are those derived from PET scrap and commercially available from Oxid under the designation Terol. Examples of suitable DMT-derived polyester polyols are commercially available from Cape Industries under the tradenames Terate®202, 203, 204, 2541, and 254A polyols. Suitable phthalic anhydride-derived pre-formed polyester polyols are commercially available from BASF Corporation under the tradename Pluracol®polyol 9118, and from Stepan Company under the tradenames StepanPol® PS-2002, PS-2402, and PS-3152. Preferably the pre-formed polyester polyols used herein are not previously compatibilized for use with a blowing agent.

The pre-formed polyester polyol may also be a polyester amide, such as a polyester amide obtained by forming a polyester polyol in the presence of an amine or amino alcohol. Such polyester amides may be obtained by condensing an amino alcohol such as ethanolamine with a phthalic acid-based material. Alternatively, such polyester amides may be obtained by using substantially the same components that make up the pre-formed polyester polyol but adding a portion of an amine or amino alcohol as a further reactant.

B. Polyether Polyol

The polyol component can also include a polyether polyol. A particularly preferred polyether polyol is a polyoxyalkylene polyether polyol. Polyoxyalkylene polyether polyols useful in the polyol component include but are not limited to any one or more of polyoxyalkylated sucrose, polyoxyalkylated glycerol, and polyoxyalkylene glycols.

Polyoxyalkylene polyether polyols can be prepared via anionic or cationic polymerization of starting materials such as one or more alkylene oxides, preferably containing from 2 to 4 carbons in the alkylene radical. Any suitable alkylene oxide may be used, and examples include 1,3-propylene oxide, 1,2-butylene oxide, 2,3-butylene oxide, amylene oxides, styrene oxide, and, preferably, ethylene oxide and 1,2-propylene oxide and mixtures thereof. The polyoxyalkylene polyether polyols alternatively may be polymerized from other starting materials such as tetrahydrofuran, alkylene oxide-tetrahydrofuran mixtures, or epihalohydrins such as epichlorohydrin. The polyoxyalkylene polyether polyols may have either primary or secondary hydroxyl groups.

Polyoxyalkylene polyether polyols can be produced by anionic polymerization of such starting materials with alkali hydroxides as catalysts, including sodium hydroxide or potassium hydroxide, or with alkali alcoholates as catalysts, including sodium methylate, sodium or potassium ethylate, or potassium isopropylate, and, in addition to the catalysts, at least one initiator molecule containing from 2 to 8, and preferably from 3 to 8, reactive hydrogens. Polyoxyalkylene polyether polyols also can be produced by cationic polymerization of such starting materials with Lewis acids as catalysts, including antimony pentachloride or boron trifluoride etherate, or with bleaching earth as catalyst.

Included among the polyoxyalkylene polyether polyols are polyoxyalkylene glycols, such as polyoxyethylene glycol, polyoxypropylene glycol, polyoxybutylene glycol, and polytetramethylene glycol; block copolymers, such as combinations of polyoxypropylene and polyoxyethylene glycols, or poly-1,2-oxybutylene and polyoxyethylene glycols, or poly-1,4-tetramethylene and polyoxyethylene glycols; and copolymer glycols prepared from blends or sequential addition of two or more alkylene oxides. The polyoxyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459.

Preferred polyoxyalkylene polyethers include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol, glycerol, 1,1,1-trimethylolpropane, 1,1,1-trimethylolethane, pentaerythritol, 1,2,6-hexanetriol, alpha-methyl glucoside, sucrose, and sorbitol. Other useful polyhydric alcohols on which to effect alkylene oxide addition include compounds derived from phenol such as 2,2-bis(4-hydroxyphenyl)-propane, commonly known as Bisphenol A.

When included in the polyol component, the polyether polyol is combined in an advantageous ratio with the aromatic polyester polyol reaction product. The amount of polyether polyol utilized in the polyol component is determined by the requirements of the application and the physical properties required of the resulting foam. For example, in applications involving isocyanate indexes near 120, e.g., preparing typical polyurethane foams, polyether polyols can be used in an amount up to 80 percent by weight, based on the total weight of the polyol component. Conversely, in applications involving isocyanate indexes near 300, e.g., preparing typical polyisocyanurate foams, less or no polyether polyol is incorporated in the polyol component.

Optional Polyols

Other types of polyols may be used in combination with the polyol component. Examples of other types of polyols include: thioether polyols; polyester amides, polyacetals, and aliphatic polycarbonates containing hydroxyl groups; amine terminated polyoxyalkylene polyethers; non-aromatic polyester polyols, graft dispersion polyols, and, preferably, polyester polyether polyols. Mixtures of two or more of the aforesaid polyols can be used so long as the combination produces a polyol component having an average hydroxyl number within the aforesaid range.

Blowing Agent

Resin blends of the invention also contain an aliphatic or cycloaliphatic $C_4$–$C_7$ hydrocarbon blowing agent. Such hydrocarbons have a boiling point of 70° C. or less at 1 atmosphere, and preferably have a boiling point of 50° C. or less at 1 atmosphere. The hydrocarbon blowing agent is physically active and has a boiling point sufficiently low so as to become gaseous and evaporate at the exothermic temperatures caused by the reaction between the isocyanate and polyols. The vaporizing hydrocarbon blowing agent provides foaming action within the resulting polyurethane matrix. The hydrocarbon blowing agents consist exclusively of carbon and hydrogen and are therefore non-halogenated by definition. Exemplary $C_4$–$C_7$ hydrocarbon blowing agents include, alone or in combination: linear or branched alkanes, such as butane, isobutane, 2,3-dimethylbutane, n-pentane, isopentane, technical-grade pentane mixtures, n-hexane, isohexane, n-heptane, isoheptane, or mixtures thereof; alkenes, such as 1-pentene, 2-methylbutene, 3-methylbutene, 1-hexene, or mixtures thereof; and cycloalkanes, such as cyclobutane, cyclopentane, cyclohexane or mixtures thereof. Preferred $C_4$–$C_7$ hydrocarbon blowing agents include cyclopentane, n-pentane, isopentane, and mixtures thereof.

Other blowing agents can be used in conjunction with $C_4$–$C_7$ hydrocarbon blowing agents. Such auxiliary blowing agents may be divided into the classes of: (1) chemically active blowing agents, which chemically react with isocyanate or other formulation ingredients to produce a gas that subsequently is liberated, thereby generating foaming action; and (2) physically active blowing agents which are gaseous at or below the exothermic foaming temperatures, thereby providing a blowing gas without the need to chemically react with the foam ingredients. Included within the meaning of physically active blowing agents are decomposition-type materials that are thermally unstable and which decompose at elevated temperatures, releasing a gas.

Preferred auxiliary chemically active blowing agents are those which react with isocyanate to liberate a gas such as $CO_2$. Suitable chemically active blowing agents include, but are not limited to, water, mono- and polycarboxylic acids having a molecular weight of from 46 to 300, salts of such polycarboxylic acids, and tertiary alcohols.

Water can be classed and used as a chemically active blowing agent because water reacts with isocyanate to produce and liberate $CO_2$ gas, the actual resulting blowing agent. However, because water consumes isocyanate groups, using water as a chemically active blowing agent requires adding an equivalent molar excess of isocyanate to compensate for the amount of isocyanates consumed by the water.

Organic carboxylic acids used as auxiliary chemically active blowing agents advantageously include aliphatic mono- and polycarboxylic acids, for example, dicarboxylic acids. Also suitable, however, are other organic mono- and polycarboxylic acids. The organic carboxylic acids may, if desired, also contain olefinically unsaturated groups, and/or may contain other substituents that can be either isocyanate-inert or isocyanate-reactive under polyisocyanate addition reaction conditions. Examples of chemically inert substituents include but are not limited to halogen atoms, such as fluorine or chlorine, and alkyl groups, such as methyl or ethyl. Organic carboxylic acids substituted with an isocyanate-inert group preferably contain at least one further group that is isocyanate-reactive, for example a mercapto group, a primary and/or secondary amino group, or a primary and/or secondary hydroxyl group. The organic carboxylic acids useful as auxiliary chemically active blowing agents generally have a molecular weight of from about 46 to about 300.

Suitable carboxylic acids are thus substituted or unsubstituted monocarboxylic acids, including but not limited to formic acid, acetic acid, propionic acid, 2-chloropropionic acid, 3-chloropropionic acid, 2,2-dichloropropionic acid, hexanoic acid, 2-ethylhexanoic acid, cyclohexanecarboxylic acid, dodecanoic acid, palmitic acid, stearic acid, oleic acid, 3-mercaptopropionic acid, glycolic acid, 3-hydroxypropionic acid, lactic acid, ricinoleic acid, 2-aminopropionic acid, benzoic acid, 4-methylbenzoic acid, salicylic acid and anthranilic acid. Suitable carboxylic acids are also substituted or unsubstituted polycarboxylic acids, including but not limited to oxalic acid, malonic acid, succinic acid, fumaric acid, maleic acid, glutaric acid, adipic acid, sebacic acid, dodecanedioic acid, tartaric acid, phthalic acid, isophthalic acid and citric acid. Preferred carboxylic acids include formic acid, propionic acid, acetic acid, and 2-ethylhexanoic acid. A most preferred carboxylic acid is formic acid.

Organic carboxylic acid salts can also be used as auxiliary chemically active blowing agents. Carboxylic acid salts are made using known methods, and typically are formed by reacting a carboxylic acid with a tertiary amine, including but not limited to triethylamine, dimethylbenzylamine, diethylbenzylamine, triethylenediamine, or hydrazine. Particularly preferred carboxylic acid salts are tertiary amine salts of formic acid. Organic carboxylic acid salts may be added as such or may be formed in situ, for example by reacting a tertiary amine with a carboxylic acid contained in the resin blend.

Tertiary alcohols can also be used as auxiliary chemically active blowing agents. Tertiary alcohols are made using known methods, and typically are formed by reacting an acyl halide with an excess of Grignard reagent, followed by hydrolysis of the reaction product. Suitable tertiary alcohols include but are not limited to t-butyl alcohol and t-pentyl alcohol.

Combinations of any of the aforementioned auxiliary chemically active blowing agents may be employed. Preferred chemically active blowing agent combinations include mixtures of some or all of formic acid, formic acid salts, and water.

Auxiliary physically active blowing agents for use in combination with the hydrocarbon blowing agents include materials that boil at or below the exothermic foaming temperature. Such physically active blowing agents preferably have a boiling point of 50° C. or less at 1 atmosphere. The most preferred physically active blowing agents are those having an ozone depletion potential of 0.05 or less. Examples of auxiliary physically active blowing agents include but are not limited to dialkyl ethers, cycloalkylene ethers and ketones; hydrochlorofluorocarbons (HCFCs); hydrofluorocarbons (HFCs); perfluorinated hydrocarbons; fluorinated ethers; and decomposition-type materials.

Any hydrochlorofluorocarbon may be used as an auxiliary physically active blowing agent in the present invention. Preferred hydrochlorofluorocarbon auxiliary blowing agents include 1-chloro-1,2-difluoroethane; 1-chloro-2,2-difluoroethane (142a); 1-chloro-1,1-difluoroethane (142b); 1,1-dichloro-1-fluoroethane (141b); 1-chloro-1,1,2-trifluoroethane; 1-chloro-1,2,2-trifluoroethane; 1,1-dichloro-1,2-difluoroethane; 1-chloro-1,1,2,2-tetrafluoroethane (124a); 1-chloro-1,2,2,2-tetrafluoroethane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gemchlorofluoroethylene (R-1131a); chloroheptafluoropropane (HCFC-217); chlorodifluoroethylene (HCFC-1122); and transchlorofluoroethylene (HCFC-1131). A most preferred hydrochlorofluorocarbon blowing agent is 1,1-dichloro-1-fluoroethane (HCFC-141b).

Suitable hydrofluorocarbons, perfluorinated hydrocarbons, and fluorinated ethers include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-152), trifluoromethane; heptafluoropropane; 1,1,1-trifluoroethane; 1,1,2-trifluoroethane; 1,1,1,2,2-pentafluoropropane; 1,1,1,3,3-pentafluoropropane; 1,1,1,3-tetrafluoropropane; 1,1,2,3,3-pentafluoropropane; 1,1,1,3,3-pentafluoro-n-butane; hexafluorocyclopropane (C-216); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, -hexane, -cyclohexane, -heptane, and -octane; perfluorodiethyl ether; perfluorodipropyl ether; and perfluoroethyl propyl ether.

Additional useful physically active blowing agents include decomposition-type materials that are thermally unstable and which decompose at elevated temperatures, releasing a gas. Examples of decomposition-type materials that release a gas upon undergoing thermal decomposition include but are not limited to pecan flour, amine/carbon dioxide complexes, and alkyl alkanoate compounds, especially methyl and ethyl formates.

The total and relative amounts of blowing agents will depend upon the desired foam density, the type of hydrocarbon, and the amount and type of additional blowing agents employed. Polyurethane foam densities typical of products destined for rigid polyurethane insulation applications encompass free rise densities of from about 1.3 to about 2.5 pounds per ft$^3$ (pcf), preferably from about 1.3 to about 2.1 pcf, and overall molded densities of from about 1.5 to about 3.0 pcf. The total amount of blowing agent, based on the weight of all foaming ingredients (i.e., the resin blend and the isocyanate), is generally from about 3 to about 15 percent by weight. The amount of hydrocarbon blowing agent, based on the weight of all foaming ingredients, is generally from about 3 to about 15 percent by weight, and preferably from about 5 to about 10 percent by weight.

The weight amount of all blowing agents in the resin blend is generally from about 5 to about 35 parts per hundred parts of all polyols (php), and preferably from about 10 to about 30 php. As described above, the hydrocarbon blowing agent in the resin blend may be augmented with auxiliary chemically active blowing agents and/or physically active blowing agents.

A minor quantity of water may be found in polyols as a byproduct of reaction, and such water may be sufficient to act as a lone auxiliary chemically active blowing agent. Optionally, however, water may be added to the resin blend in an amount of from about 0.05 to about 5 php, and preferably from about 0.25 to about 1.0 php. Other auxiliary chemically active blowing agents may be employed instead of, or in addition to, water. Auxiliary physically active blowing agents also may be employed instead of, or in addition to, auxiliary chemically active blowing agents.

The amount of hydrocarbon blowing agent in the resin blend of the invention is from about 1 to about 35 percent by weight. More preferably, the amount of hydrocarbon blowing agent is from about 5 to about 30 percent by weight, based on the total weight of the resin blend. Most preferably, the amount of hydrocarbon blowing agent is from about 10 to about 20 percent by weight, based on the total weight of the resin blend.

Other Optional Ingredients

Optionally preferred ingredients include cell-stabilizing surfactants, flame retardants, catalysts, and nonionic surfactants.

A. Cell-stabilizing Surfactants

The resin blends of the invention optionally contain cell-stabilizing surfactants. Examples of cell-stabilizing surfactants include but are not limited to OSi Y-10745 silicone surfactant and OSi L-5440 silicone surfactant, both available commercially from OSi Specialties; Dabco DC-5098 silicone surfactant, available commercially from Air Products and Chemicals, Inc.; Tegostab B-84PI silicone surfactant, available commercially from Goldschmidt Chemical Corp.; and Vorasurf 504, a non-silicone surfactant available from Dow Chemical Co. Particularly preferred cell-stabilizing surfactants include OSi Y-10745, OSi L-5440, and Dabco DC-5098. Cell-stabilizing surfactants, if employed, are added to the resin blend in an amount of from about 0.5 to about 5 php, and preferably from about 1 to about 3 php. The amount of cell-stabilizing surfactant based on the weight of all foaming ingredients is from about 0.2 to about 2.5 percent by weight, and preferably from about 0.4 to about 1.5 percent by weight.

B. Flame Retardants

Flame retardant additives may be added to achieve foams having a particular flame retardancy classification. Preferred flame retardants are solid or liquid compounds containing one or more of the elements phosphorus, chlorine, bromine, and boron. Examples of flame retardants include but are not limited to tris-(2-chloro isopropyl) phosphate, tetrakis-(2-chloro ethyl) ethylene diphosphate, tris-(beta-chloro ethyl) phosphate, and tris-(2,3-dibromo propyl) phosphate. Tris-(2-chloro isopropyl) phosphate is a particularly preferred flame retardant. Flame retardants, if employed, are added to the resin blend in an amount of from about 2 to about 50 php, and preferably from about 5 to about 25 php. The amount of flame retardant based on the weight of all foaming ingredients is from about 1 to about 25 percent by weight, and preferably from about 2 to about 12 percent by weight.

C. Catalysts

The resin blends of the invention optionally contain catalysts to accelerate the reaction with the polyisocyanate. Suitable catalysts include but are not limited to salts of organic carboxylic acids, for example sodium salts, ammonium salts, and preferably potassium salts. Examples include trimethyl-2-hydroxypropyl ammonium formate, trimethyl-2-hydroxypropyl ammonium octanoate, potassium formate, and potassium acetate. Tertiary amines also promote urethane linkage formation, and include but are not limited to triethylamine, 3-methoxypropyldimethylamine, triethylenediamine, pentamethyldiethylenetriamine, and bis(dimethylaminopropyl)urea. Particularly preferred catalysts include potassium 2-ethylhexanoate, available commercially from Air Products and Chemicals under the tradename Dabco K-15 Catalyst; pentamethyldiethylenetriamine, available commercially from Air Products and Chemicals under the tradename Polycat 5 Catalyst; and dimethylcyclohexylamine, available commercially from Air Products and Chemicals under the tradename Polycat 8 Catalyst. Catalysts, if employed, are added to the resin blend in an amount of from about 1 to about 10 php, and preferably from about 1.5 to about 8 php. The amount of catalyst based on the weight of all foaming ingredients is from about 0.5 to about 5 percent by weight, and preferably from about 1 to about 4 percent by weight.

All documents, e.g., patents and journal articles, cited above or below are hereby incorporated by reference in their entirety.

One skilled in the art will recognize that modifications may be made in the present invention without deviating from the spirit or scope of the invention. The invention is illustrated further by the following examples, which are not to be construed as limiting the invention in spirit or scope to the specific procedures or compositions described therein.

The polyols described below are subsequently used to produce resin blends illustrating known polyols and aromatic polyester polyols of the invention. Polyols A–E, N, and the commercial polyols are representative of known polyols. Polyols F–M, P, and Q are representative of and/or incorporate aromatic polyester polyols of the invention.

Some examples utilize the following commercial polyols:
StepanPol® PS-2352 (Stepan Co.): A polyester polyol that is a modified reaction product of phthalic anhydride and diethylene glycol. It has a typical hydroxyl number of 240 mg KOH/g and a typical acid number of 0.8 mg KOH/g.
StepanPol® PS-2402 (Stepan Co.): A polyester polyol that is a reaction product of phthalic anhydride and diethylene glycol. It has a typical hydroxyl number of 250 mg KOH/g and a typical acid number of 2.5 mg KOH/g.
Thanol R-370 (Eastman Chemical Co.): a polyether polyol with a typical hydroxyl number of 370 mg KOH/g.

Polyol A 5017 g. of phthalic anhydride, 6983 g. of diethylene glycol, and 6 g. of tetrabutyl titanate are combined in a 12-liter reaction flask and reacted at 200–210° C. with application of vacuum to remove water of reaction. The resulting polyol is a clear light yellow liquid with a hydroxyl number of 289, an acid number of 0.7, and a viscosity of 3,900 centipoise at 25° C.

Polyols B–E

The polyol obtained in Example A is mixed at room temperature with soybean oil or castor oil in the ratios shown in Table 1 to produce Examples B–E. Examples B-E are polyol compositions in which the hydrophobic material is simply blended with the aromatic polyester polyol, with no significant inter-esterification taking place. As such, Examples B–E are representative of compositions described in U.S. Pat. No. 5,451,615 and WO 96/12759.

TABLE 1

| Polyol Example | B | C | D | E |
|---|---|---|---|---|
| Composition, percent by weight: | | | | |
| % Polyol A | 65 | 75 | 65 | 50 |
| % Soybean Oil | 35 | — | — | — |
| % Castor Oil | — | 25 | 35 | 50 |
| | 100.0 | 100.0 | 100.0 | 100.0 |
| Polyol Appearance | Opaque | Opaque | Opaque | Opaque |

The opacity of these blends indicates insolubility of the hydrophobic material in the aromatic polyester polyol of Example A, and these blends separate into two phases in one day. Thus they are poorly suited to be sold commercially as a single product.

Polyol F 2655 g. phthalic anhydride, 3043 g. diethylene glycol, 961 g. trimethylolpropane, and 3.4 g. tetrabutyl titanate are combined in a 12-liter reaction flask and reacted at 200–210° C., with application of a nitrogen sparge to remove water of reaction. The mixture is digested until the acid number drops to 3. 3178 g. soybean oil is added, and the mixture is maintained at 200° C. for 4 hr. with stirring. The resulting polyol is a clear straw-colored liquid having a hydroxyl number of 148 and an acid number of 3.0.

Polyol G 89.9 g. of Polyol F is blended with 10.1 g. of diethylene glycol to produce a polyol with a hydroxyl number of 240 and a viscosity of 684 centipoise at 25° C.

Polyol H 974 g. phthalic anhydride, 1038 g. diethylene glycol, 454 g. trimethylolpropane, and 1.3 g. tetrabutyl titanate are combined in a 5-liter reaction flask and reacted at 210° C. until the acid number falls below 3. 1541 g. soybean oil is added, and the mixture is maintained at 200° C. for 12 hr. with stirring. 410 g. additional diethylene glycol is added both to replace the amount lost by distillation and to adjust the final hydroxyl value to the desired range. The resulting polyol is a clear straw-colored liquid with a hydroxyl number of 240 and an acid number of 2.2.

Polyol J 712 g. phthalic anhydride, 510 g. diethylene glycol, 654 g. trimethylolpropane, and 1.0 g. tetrabutyl titanate are combined in a 5-liter reaction flask and reacted at 210° C. with application of a nitrogen sparge to remove water of reaction. When the acid value falls below 1, 2132 g. soybean oil is added, and the mixture is maintained at 200° C. for 12 hr. with stirring. 137 g. additional diethylene glycol is added both to replace the amount lost by distillation and to adjust the final hydroxyl value to the desired range. The resulting polyol is a clear straw-colored liquid with a hydroxyl number of 240, an acid number of 0.8, and a viscosity of 656 centipoise at 25° C.

Polyol K 582 g. phthalic anhydride, 1188 g. diethylene glycol, and 0.9 g. tetrabutyl titanate are combined in a 5-liter reaction flask and reacted at 200–210° C., with application of vacuum to remove water of reaction. The resulting intermediate polyol has a hydroxyl number of 462 and an acid number of 3.2. 1165 g. soybean oil and 30 g. diethylene glycol are added, and the mixture is maintained at 200° C. for 24 hr. with stirring. The resulting polyol is a slightly hazy amber liquid with a hydroxyl number of 320, an acid number of 3.1, and a viscosity of 170 centipoise at 25° C.

Polyol L 1177 g. phthalic anhydride, 1066 g. trimethylolpropane, 1758 g. Neodol 45 (a $C_{14}$–$C_{15}$ fatty alcohol produced by Shell Chemical Co.), and 2.0 g. tetrabutyl titanate are combined in a 5-liter reaction flask, with a nitrogen sparge to remove water of reaction. The mixture is reacted with stirring at 200° C. until the acid number drops to 3, at which point the hydroxyl number is 210. 147 g. diethylene glycol is added to adjust the final hydroxyl number to the desired range. The resulting polyol is a clear straw-colored liquid with a hydroxyl number of 240 and an acid number of 3.1.

Polyol M 376 g. phthalic anhydride, 524 g. diethylene glycol, and 0.5 g. tetrabutyl titanate are combined in a 2-liter reaction flask and reacted at 200–210° C., with a nitrogen sparge to remove water of reaction. The resulting intermediate polyol has a hydroxyl number of 311. 854 g. castor oil is added, and the mixture is maintained at 200° C. for 4 hr. with stirring. The resulting polyol is a clear amber liquid with a hydroxyl number of 232, an acid number of 0.7, and a viscosity of 1000 centipoise at 25° C.

The clarity of Polyols F through M, in which the hydrophobic material has been reacted onto the polyester polyol, demonstrates that these polyols are different, both chemically and functionally, from the opaque Polyols B through E, in which the hydrophobic material is merely blended in at ambient temperature.

It is often advantageous to use blends of polyether and polyester polyols. Polyol N is a mixture of this type in which the polyester polyol is representative of known polyols, whereas Polyols P and Q illustrate the application of the invention to this type of mixture.

Polyol N 50 g. Polyol A and 50 g. Thanol R-370 are blended at room temperature to produce a polyether/polyester blend with a nominal hydroxyl number of 330.

Polyol P 1061 g. phthalic anhydride, 1398 g. diethylene glycol, and 1.2 g. tetrabutyl titanate are combined in a 5-liter reaction flask and reacted at 200–210° C., with application of a nitrogen sparge to remove water of reaction. The mixture is digested until the acid number drops to 3. 540 g. Stepan C-68, a methyl ester of mixed $C_{16}$–$C_{18}$ fatty acids, is added, and the mixture is maintained at 200° C. with stirring until evolution of methanol ceases. The resulting polyester polyol is a clear straw-colored liquid with a hydroxyl number of 262 and an acid number of 3.3. 150 g. of this polyester polyol is blended at room temperature with 150 g. of Thanol R-370 to produce a polyether/polyester blend with a nominal hydroxyl number of 316.

Polyol Q 446.6 g. dimethyl terephthalate, 553.4 g. diethylene glycol, and 0.5 g. tetrabutyl titanate are combined in a 3-liter reaction flask and reacted at 200° C., with a nitrogen sparge to accelerate removal of methanol. When the evolution of methanol ceases, 200 g. soybean oil is added, and the mixture is maintained at 200° C. for 4 hr. with stirring. The resulting polyester polyol has a hydroxyl number of 267 and an acid number of 2.7. 50 g. of this polyester polyol is blended at room temperature with 50 g. of Thanol R-370 to produce a polyether/polyester blend with a nominal hydroxyl number of 318.

Polyols N–Q are clear liquids at room temperature.

Table 2 summarizes the composition variables of the polyols of Examples A–Q. The listed percentages of hydrophobic materials are calculated values, based on weights of reactants charged, and adjusting for theoretical losses of water or methanol.

Polyols B–Q are combined with other ingredients to produce resin blends as indicated in Tables 3 and 4. The initial appearance of the resin blends is noted, and viscosities are measured using a Brookfield Viscometer. The resin blends are then observed at the indicated intervals for evidence of phase separation. Those resin blends showing visible evidence of a separate liquid phase are denoted by the entry "separates", whereas those which show no such separate liquid phase are characterized as "stable".

Trade-named materials used in the examples are further identified below: OSi Y-10745 and OSi L-5440 are silicone surfactants provided by OSi Specialties. Dabco DC-5098 is a silicone surfactant provided by Air Products and Chemicals, Inc. Dabco K-15 Catalyst is a solution of potassium 2-ethylhexanoate provided by Air Products and Chemicals, Inc.

Polycat 5 Catalyst is pentamethyldiethylenetriamine, provided by Air Products and Chemicals, Inc.

Polycat 8 Catalyst is dimethylcyclohexylamine, provided by Air Products and Chemicals, Inc.

Mondur 489 and Mondur MR are polymeric isocyanates provided by Bayer Corporation.

The resin blends in Tables 3 and 4 contain hydrocarbon blowing agents in levels ranging from 13 to 30 parts per 100 parts of polyol blend. These are typical amounts effective in producing final foam densities in the desired 1.5 to 2.5 lb./cu. ft. range. The amount of hydrocarbon blowing agent required in the resin blend will vary depending on the density desired, on the amount of water added to generate carbon dioxide through reaction with the isocyanate, and on the isocyanate index at which the foam is made. The isocyanate index is defined as the molar ratio of isocyanate groups to isocyanate-reactive groups, multiplied by 100. Isocyanate indexes of about 100–120 are typically used in making polyurethane foams, and indexes of 200–300 or higher are typically used in making polyisocyanurate foams. At the higher isocyanate indices used in manufacturing polyisocyanurate foams, the proportion of resin blend in the foaming mix is relatively lower, and the proportion of isocyanate is higher, than is typical in manufacturing polyurethane foams. For this reason, when making polyisocyanurate foams, a higher percentage of blowing agent may be required in the resin blend to achieve a target foam density, as compared to when making polyurethane foams, where a relatively lower percentage of blowing agent can produce the same target foam density. Table 3 illustrates resin blend formulations typically used in manufacturing polyisocyanurate foams, and Table 4 illustrates resin blend formulations typically used in manufacturing polyurethane foams.

In Table 3, Examples 1–6 illustrate known polyol resin blends incorporating normal pentane as the blowing agent. Examples 1–6 all exhibit opacity and poor phase stability. Examples 7–14 illustrate resin blends of the invention incorporating n-pentane, and are clear and show no phase separation. In addition, the resin blends of the invention tend to possess much lower viscosities compared to known polyol resin blends. Also in Table 3, Examples 15 and 16 illustrate, respectively, a known polyol resin blend and a resin blend of the invention that each incorporate isopentane as blowing agent. Finally, Examples 17–19 illustrate known polyol resin blends incorporating cyclopentane as blowing agent, and Examples 20 and 21 illustrate resin blends of the invention incorporating cyclopentane blowing agent.

In Table 4, Examples 22–24 illustrate resin blend formulations utilizing polyether/polyester blends as the polyol component. In addition to the observations described previously, a compatibility limit test was performed on these formulations. A separate portion of the resin blend was prepared, and during this process the hydrocarbon blowing agent was added gradually in weighed amounts, with stirring. After each addition the mixture was observed for clarity.

Typically in compatibility limit testing, as the amount of hydrocarbon blowing agent is increased, the appearance of the mixture will change from clear, through increasing degrees of haziness, to fully opaque. The "compatibility limit" is defined as the maximum amount of blowing agent, to the nearest 1 php, that can be added before the mixture becomes too hazy to allow a specific light source to be seen clearly through a 1.7-inch cross-section of sample. The limit determined by this test generally correlates well with the maximum blowing agent content that can be added without causing phase separation to occur on standing. The test is employed as a measure of the relative effectiveness of various polyols and polyol/additive combinations in compatibilizing hydrocarbon blowing agents in a resin blend.

In Table 4, Example 22 is representative of known polyol resin blends, while Examples 23 and 24 illustrate resin blends of the invention. Examples 22–24 all incorporate cyclopentane as blowing agent. Examples 23 and 24, as compared to Example 22, demonstrate the superior hydrocarbon compatibilizing characteristics of resin blends of the invention, illustrating that resin blends of the invention tolerate 2 to 3 times as much cyclopentane while maintaining clarity.

In Table 5, Examples F1–F4 summarize the physical parameters of closed-cell polyurethane and polyisocyanurate foams produced from resin blends of the invention. Examples F1–F4 were produced by combining the indicated resin blend and polymeric isocyanate at 25° C. and agitating the mixture for 6 sec. using a motor-driven mixing blade rotating at 2800 rpm.

TABLE 2

| Polyol Designation | Type | Hydroxyl Number | Reacted Hydroxylated Material | Unreacted Hydrophobic Material | Reacted Hydrophobic Material | Percent Hydrophobic Material |
|---|---|---|---|---|---|---|
| A | PA Polyester | 289 | DEG | — | — | 0 |
| B | PA Polyester | 202 | DEG | Soybean Oil | — | 35 |
| C | PA Polyester | 258 | DEG | Castor Oil | — | 25 |
| D | PA Polyester | 245 | DEG | Castor Oil | — | 35 |
| E | PA Polyester | 226 | DEG | Castor Oil | — | 50 |
| F | PA Polyester | 148 | DEG, TMP | — | Soybean Oil | 33 |
| G | PA Polyester | 240 | DEG, TMP | — | Soybean Oil | 30 |
| H | PA Polyester | 240 | DEG, TMP | — | Soybean Oil | 36 |
| J | PA Polyester | 240 | DEG, TMP | — | Soybean Oil | 51 |
| K | PA Polyester | 320 | DEG | — | Soybean Oil | 40 |
| L | PA Polyester | 240 | TMP | — | $C_{14}$–$C_{15}$ alcohol | 44 |
| M | PA Polyester | 232 | DEG | — | Castor Oil | 50 |
| N | Polyether/PA polyester blend | 330 | DEG | — | — | 0 |
| P | Polyether/PA polyester blend | 316 | DEG | — | Methyl ester of $C_{16}$–$C_{18}$ fatty acids | 9 |
| Q | Polyether/DMT polyester blend | 318 | DEG | — | Soybean Oil | 9 |

Abbreviations:
PA = Phthalic anhydride-based
DMT = Dimethyl terephthalate-based
DEG = Diethylene glycol
TMP = Trimethylolpropane

TABLE 3

| Example No. | 1* | 2* | 3* | 4* | 5* | 6* | 7 | 8 |
|---|---|---|---|---|---|---|---|---|
| Polyol Used | StepanPol PS-2402 | B | C | D | E | StepanPol PS-2352 | F | G |
| Resin blend composition (php): | | | | | | | | |
| Polyol | 100.00 | 100.00 | 100.00 | 100.00 | 100.00 | 100.00 | 100.00 | 100.00 |
| Tris-(2-chloroisopropyl) phosphate | 15.00 | 15.00 | 15.00 | 15.00 | 15.00 | 15.00 | 15.00 | 15.00 |
| OSi Y-10745 silicone surfactant | 2.00 | 2.00 | 2.00 | 2.00 | 2.00 | 2.00 | 2.00 | 2.00 |
| Dabco DC5098 silicone surfactant | — | — | — | — | — | — | — | — |
| Dabco K-15 Catalyst | 4.00 | 4.00 | 4.00 | 4.00 | 4.00 | 4.00 | 3.00 | 4.00 |
| N,N-dimethylethanolamine catalyst | 1.00 | 1.00 | 1.00 | 1.00 | 1.00 | 1.00 | 0.75 | 1.00 |
| Polycat 5 Catalyst | — | — | — | — | — | — | — | — |
| Water | — | — | — | — | — | — | — | — |
| n-pentane | 30.00 | 30.00 | 30.00 | 30.00 | 30.00 | 30.00 | 30.00 | 30.00 |
| Isopentane | — | — | — | — | — | — | — | — |
| Cyclopentane | — | — | — | — | — | — | — | — |
| Resin Blend Appearance (initial) | Opaque | Opaque | Opaque | Opaque | Opaque | Opaque | Clear | Clear |
| Resin Blend Viscosity (centipoise, 20° C.) | 10,980 | — | — | — | — | 7,220 | — | 173 |
| Resin blend phase stability, 1 day | Separates | Separates | Separates | Separates | Separates | Separates | Stable | Stable |
| Resin blend phase stability, 1 week | Separates | Separates | Separates | Separates | Separates | Separates | Stable | Stable |

| Example No. | 9 | 10 | 11 | 12 | 13 | 14 | 15* | 16 |
|---|---|---|---|---|---|---|---|---|
| Polyol Used | G | G | H | J | K | L | StepanPol PS-2402 | G |
| Resin blend composition (php): | | | | | | | | |
| Polyol | 100.00 | 100.00 | 100.00 | 100.00 | 100.00 | 100.00 | 100.00 | 100.00 |
| Tris-(2-chloroisopropyl) phosphate | — | 15.00 | 15.00 | 15.00 | 15.00 | 15.00 | 15.00 | 15.00 |
| OSi Y-10745 silicone surfactant | 2.00 | 2.00 | 2.00 | 2.00 | 2.00 | 2.00 | — | 2.00 |
| Dabco DC5098 silicone surfactant | — | — | — | — | — | — | 2.00 | — |
| Dabco K-15 Catalyst | 4.00 | 2.50 | 4.00 | 4.00 | 4.00 | 4.00 | 2.50 | 4.00 |
| N,N-dimethylethanolamine catalyst | 1.00 | — | 1.00 | 1.00 | 1.00 | 1.00 | — | 1.00 |
| Polycat 5 Catalyst | — | 0.25 | — | — | — | — | 0.25 | — |
| Water | — | 1.00 | — | — | — | — | — | — |
| n-pentane | 30.00 | 25.00 | 30.00 | 30.00 | 30.00 | 30.00 | — | — |
| Isopentane | — | — | — | — | — | — | 30.00 | 30.00 |
| Cyclopentane | — | — | — | — | — | — | — | — |
| Resin Blend Appearance (initial) | Clear | Clear | Clear | Clear | Clear | Clear | Opaque | Clear |
| Resin Blend Viscosity (centipoise, 20° C.) | — | — | — | 64 | 40 | 148 | 14,980 | 190 |
| Resin blend phase stability, 1 day | Stable | Stable | Stable | Stable | Stable | Stable | Stable | Stable |
| Resin blend phase stability, 1 week | Stable | Stable | Stable | Stable | Stable | Stable | Separates | Stable |

| Example No. | 17* | 18* | 19* | 20 | 21 |
|---|---|---|---|---|---|
| Polyol Used | StepanPol PS-2402 | D | E | G | M |
| Resin blend composition (php): | | | | | |
| Polyol | 100.00 | 100.00 | 100.00 | 100.00 | 100.00 |
| Tris-(2-chloroisopropyl) phosphate | 15.00 | 15.00 | 15.00 | 15.00 | 15.00 |
| OSi Y-10745 silicone surfactant | — | 2.00 | 2.00 | 2.00 | 2.00 |
| Dabco DC5098 silicone surfactant | 2.00 | — | — | — | — |
| Dabco K-15 Catalyst | 2.50 | 4.00 | 4.00 | 4.00 | 4.00 |
| N,N-dimethylethanolamine catalyst | — | 1.00 | 1.00 | 1.00 | 1.00 |
| Polycat 5 Catalyst | 0.25 | — | — | — | — |
| Water | — | — | — | — | — |
| n-pentane | — | — | — | — | — |
| Isopentane | — | — | — | — | — |
| Cyclopentane | 30.00 | 30.00 | 30.00 | 30.00 | 30.00 |
| Resin Blend Appearance (intial) | Opaque | Opaque | Opaque | Clear | Clear |
| Resin Blend Viscosity (centipoise, 20° C.) | 7,210 | — | — | 148 | — |
| Resin blend phase stability, 1 day | Separates | Separates | Separates | Stable | Stable |
| Resin blend phase stability, 1 week | Separates | Separates | Separates | Stable | Stable |

*= comparative examples

TABLE 4

| Example No. | 22* | 23 | 24 |
|---|---|---|---|
| Polyol used | N | P | Q |
| Resin blend composition (php) | | | |
| Polyol | 100.00 | 100.00 | 100.00 |
| Polycat 5 Catalyst | 1.30 | 1.30 | 1.30 |
| Polycat 8 Catalyst | 0.50 | 0.50 | 0.50 |
| Dabco K-15 Catalyst | 1.00 | 1.00 | 1.00 |
| Osi L-5440 silicone surfactant | 2.00 | 2.00 | 2.00 |

TABLE 4-continued

| Example No. | 22* | 23 | 24 |
|---|---|---|---|
| Water | 1.50 | 1.50 | 1.50 |
| Cyclopentane | 13.00 | 13.00 | 13.00 |
| Total resin | 119.30 | 119.30 | 119.30 |
| Maximum parts cyclopentane with clarity (compatibility limit test) | 7 | 14 | 20 |
| Resin blend appearance (initial) with 13.00 parts cyclopentane | Opaque | Clear | Clear |
| Resin blend phase stability, 1 day | Separates | Stable | Stable |
| Resin blend phase stability, 1 week | Separates | Stable | Stable |

* = comparative example

TABLE 5

| Foam Example No. | F1 | F2 | F3 | F4 |
|---|---|---|---|---|
| Polyol used | H | H | K | P |
| Resin blend composition (php) | | | | |
| Polyol | 100.00 | 100.00 | 100.00 | 100.00 |
| Tris-(2-chloroisopropyl) phosphate | 15.00 | 15.00 | 15.00 | — |
| Osi Y-10745 silicone surfactant | 2.00 | 2.00 | 2.00 | — |
| Osi L-5440 silicone surfactant | — | — | — | 2.00 |
| Dabco K-15 Catalyst | 4.00 | 4.00 | 4.00 | 1.00 |
| N,N-dimethylethanolamine catalyst | 1.00 | 1.00 | 1.00 | — |
| Polycat 5 Catalyst | — | — | — | 1.30 |
| Polycat 8 Catalyst | — | — | — | 0.50 |
| Water | — | — | — | 1.50 |
| n-pentane | 26.50 | — | 26.50 | — |
| Cyclopentane | — | 26.50 | — | 13.00 |
| Total resin | 148.50 | 148.50 | 148.50 | 119.30 |
| Resin Blend Appearance (initial) | Clear | Clear | Clear | Clear |
| Mondur 489 polymeric isocyanate (php) | 188.51 | 188.51 | 247.15 | — |
| Mondur MR polymeric isocyanate (php) | — | — | — | 117.72 |
| Isocyanate Index | 300 | 300 | 300 | 120 |
| Foaming test - reactivity and foam properties: | | | | |
| Cream time (sec) | 11 | 18 | 12 | 6 |
| Gel time (sec) | 34 | 31 | 28 | 24 |
| Foam density (lb./cu. ft.) | 1.77 | 1.93 | 2.01 | 1.62 |
| Cell structure | Fine, regular | Fine, regular | Fine, regular | Fine, regular |
| Foam compressive strength, parallel to rise (psi) | 31 | — | — | — |

The invention and the manner and process of making and using it, are now described in such full, clear, concise and exact terms as to enable any person skilled in the art to which it pertains, to make and use the same. Although the foregoing describes preferred embodiments of the present invention, modifications may be made therein without departing from the spirit or scope of the present invention as set forth in the claims. To particularly point out and distinctly claim the subject matter regarded as invention, the following claims conclude this specification.

What is claimed is:

1. A polyol based resin blend comprising:
   (a) a polyol component comprising:
   (I) from about 20 to about 100 percent by weight of an aromatic polyester polyol reaction product tormed by inter-esterification of:
   (i) from about 10 to about 70 percent by weight of a phthalic acid based material;
   (ii) from about 20 to about 60 percent by weight of a hydroxylated material having a functionality of at least 2; and
   (iii) from about 1 to about 40 percent by weight of a hydrophobic material having:
   (1) from one to six radicals, the radicals being selected from the group consisting of carboxylic acid groups, carboxylic acid ester groups, hydroxyl groups, and mixtures thereof;
   (2) hydrocarbon groups totaling at least 4 carbon atoms for each radical present; and
   (3) an average molecular weight of from about 100 to about 1000; wherein the hydrophobic material is substantially free of diner acid; and
   (II) from 0 to about 80 percent by weight of a polyether polyol; and
   (b) from about 10 to about 35 parts per hundred parts of polyol of a $C_4$–$C_7$ hydrocarbon blowing agent.

2. A blend according to claim 1, wherein the amount of the phthalic acid based material relative to the amount of the hydroxylated material is selected such that the aromatic polyester polyol (I) has a hydroxyl number of between 100 and 600.

3. A blend according to claim 1, wherein the amount of the hydrophobic material in the aromatic polyester polyol (I) is from about 5 to about 40 percent by weight, based on the total weight of the aromatic polyester polyol (I).

4. A blend according to claim 3, wherein the amount of the hydrophobic material in the aromatic polyester polyol (I) is from about 15 to about 40 percent by weight, based on the total weight of the aromatic polyester polyol (I).

5. A blend according to claim 3, wherein the amount of the phthalic acid based material relative to the amount of the hydroxylated material is selected such that the aromatic polyester polyol (I) has a hydroxyl number of between 100 and 600.

6. A blend according to claim 2, wherein the hydroxylated material is selected from the group consisting of ethylene glycol, diethylene glycol, triethylene glycol, propylene glycol, dipropylene glycol, trimethylene glycol, butylene glycols, 1,2-cyclohexanediol, poly(oxyalkylene)polyols derived by the condensation of ethylene oxide, propylene oxide, or any combination thereof, glycerol, 1,1,1-trimethylolpropane, 1,1,1-trimethylolethane, 2,2-dimethyl-1,3-propane diol, pentaerythritol, and mixtures thereof.

7. A blend according to claim 6, wherein the hydrophobic material is selected from the group consisting of castor oil, coconut oil, corn oil, cottonseed oil, linseed oil, olive oil, palm oil, palm kernel oil, peanut oil, soybean oil, sunflower oil, tall oil, tallow, and mixtures thereof.

8. A blend according to claim 7, wherein the phthalic acid based material is selected from the group consisting of phthalic acid, isophthalic acid, terephthalic acid, methyl esters of phthalic, isophthalic, or terephthalic acid, phthalic anhydride, dimethyl terephthalate, polyethylene terephthalate, trimellitic anhydride, and mixtures thereof.

9. A blend according to claim 8, wherein the phthalic acid based material is phthalic anhydride and the hydroxylated material is diethylene glycol.

10. A blend according to claim 8, wherein the phthalic acid based material is phthalic anhydride and the hydroxylated material is a mixture of diethylene glycol and 1,1,1-trimethylolpropane.

11. A blend according to claim 9, wherein the hydrocarbon blowing agent is a pentane.

12. A blend according to claim 10, wherein the hydrocarbon blowing agent is a pentane.

13. A blend according to claim 1, wherein the polyol component further comprises one or more of a polyol selected from the group consisting of a thioether polyol, a polyester amide containing hydroxyl groups, a polyacetal containing hydroxyl groups, an aliphatic polycarbonate containing hydroxyl groups, an amine terminated polyoxyalkylene polyether, a non-aromatic polyester polyol, a graft dispersion polyol, and a polyester polyether polyol.

14. A polyurethane or polyisocyanurate foam formed by reacting a polyisocyanate with the polyol based resin blend of claim 1.

15. A method for preparing a rigid closed-cell polyisocyanate-based foam, comprising reacting a polyisocyanate and a polyol based resin blend, wherein the polyol based resin blend comprises:

(a) a polyol component comprising:
  (I) from about 20 to about 100 percent by weight of an aromatic polyester polyol reaction product formed by inter-esterification of:
    (i) from about 10 to about 70 percent by weight of a phthalic acid based material;
    (ii) from about 20 to about 60 percent by weight of a hydroxylated material having a functionality of at least 2; and
    (iii) from about 1 to about 40 percent by weight of a hydrophobic material having:
      (1) from one to six radicals, the radicals being selected from the group consisting of carboxylic acid groups, carboxylic acid ester groups, hydroxyl groups, and mixtures thereof;
      (2) hydrocarbon groups totaling at least 4 carbon atoms for each radical present; and
      (3) an average molecular weight of from about 100 to about 1000; wherein the hydrophobic material is substantially free of dimer acid; and
  (II) from 0 to about 80 percent by weight of a polyether polyol; and
(b) from about 10 to about 35 parts per hundred parts of polyol of a $C_4$–$C_7$ hydrocarbon blowing agent.

16. The method of claim 15, wherein the polyol component further comprises one or more of a polyol selected from the group consisting of a thioether polyol, a polyester amide containing hydroxyl groups, a polyacetal containing hydroxyl groups, an aliphatic polycarbonate containing hydroxyl groups, an amine terminated polyoxyalkylene polyether, a non-aromatic polyester polyol, a graft dispersion polyol, and a polyester polyether polyol.

* * * * *

(12) EX PARTE REEXAMINATION CERTIFICATE (10555th)
United States Patent
Hickey et al.

(10) Number: US 6,359,022 C1
(45) Certificate Issued: *Mar. 31, 2015

(54) PENTANE COMPATIBLE POLYESTER POLYOLS

(75) Inventors: F. Leo Hickey, Arlington Heights, IL (US); Kevin L. Rooney, San Francisco, CA (US)

(73) Assignee: Stepan Company, Northfield, IL (US)

Reexamination Request:
No. 90/006,824, Oct. 20, 2003
No. 90/007,619, Jul. 7, 2005

Reexamination Certificate for:
Patent No.: 6,359,022
Issued: Mar. 19, 2002
Appl. No.: 09/289,043
Filed: Apr. 9, 1999

(*) Notice: This patent is subject to a terminal disclaimer.

Related U.S. Application Data

(63) Continuation-in-part of application No. 08/949,239, filed on Oct. 10, 1997, now Pat. No. 5,922,779.

(51) Int. Cl.
| | |
|---|---|
| *C08G 18/00* | (2006.01) |
| *C08J 9/00* | (2006.01) |
| *C08J 9/14* | (2006.01) |
| *C08G 18/40* | (2006.01) |
| *C08G 18/42* | (2006.01) |
| *C08G 101/00* | (2006.01) |

(52) U.S. Cl.
CPC ............ *C08J 9/142* (2013.01); *C08G 18/4288* (2013.01); *C08J 2205/10* (2013.01); *C08G 2101/0025* (2013.01); *C08G 2101/005* (2013.01); *C08J 2375/04* (2013.01); *C08G 18/4018* (2013.01); *C08J 2205/052* (2013.01); *C08J 9/141* (2013.01)
USPC ....... 521/114; 252/182.24; 521/131; 521/172

(58) Field of Classification Search
None
See application file for complete search history.

(56) References Cited

To view the complete listing of prior art documents cited during the proceedings for Reexamination Control Numbers 90/006,824 and 90/007,619, please refer to the USPTO's public Patent Application Information Retrieval (PAIR) system under the Display References tab.

*Primary Examiner* — Alan Diamond

(57) ABSTRACT

Disclosed are aromatic polyester polyols, polyol based resin blends, and rigid closed-cell polyisocyanate-based foams made using the polyol based resin blends. The resin blends generally comprise:
(a) an aromatic polyester polyol reaction product formed by inter-esterification of a phthalic acid based material; a hydroxylated material having a functionality of at least 2; and a hydrophobic material; and
(b) a $C_4$—$C_7$ hydrocarbon blowing agent. Also disclosed is a method for preparing rigid closed-cell polyisocyanate-based foams comprising reacting a polyisocyanate and a polyol based resin blend.

At the time of issuance and publication of this certificate, the patent remains subject to pending reissue application number 11/788,833 filed Apr. 20, 2007. The claim content of the patent may be subsequently revised if a reissue patent is issued from the reissue application.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-16 are cancelled.

\* \* \* \* \*